United States Patent

Lees

[11] Patent Number: 6,066,048
[45] Date of Patent: May 23, 2000

[54] PUNCH AND DIE FOR PRODUCING CONNECTOR PLATES

[75] Inventor: William F. Lees, Bedford, Tex.

[73] Assignee: Alpine Engineered Products, Inc., Pompano Beach, Fla.

[21] Appl. No.: 09/078,902

[22] Filed: May 13, 1998

Related U.S. Application Data

[63] Continuation-in-part of application No. 08/710,369, Sep. 16, 1996, Pat. No. 5,833,421.

[51] Int. Cl.[7] .................................................... B21G 3/00
[52] U.S. Cl. ......................... 470/110; 470/183; 470/192; 72/333; 72/414; 72/475
[58] Field of Search .............................. 72/325, 326, 332, 72/333, 412, 414, 470, 475, 476; 470/34, 110, 183, 192

[56] References Cited

U.S. PATENT DOCUMENTS

| | | |
|---|---|---|
| Re. 31,807 | 1/1985 | Knowles . |
| 3,016,586 | 1/1962 | Atkins . |
| 3,241,424 | 3/1966 | Moehlenpah et al. . |
| 3,242,788 | 3/1966 | Broder ................................ 411/921 X |
| 3,322,018 | 5/1967 | Moehlenpah et al. . |
| 3,362,277 | 1/1968 | Moehlenpah et al. . |
| 3,417,651 | 12/1968 | Moehlenpah . |
| 3,417,652 | 12/1968 | Menge . |
| 3,479,919 | 11/1969 | Lidsky . |
| 3,479,920 | 11/1969 | Sanford . |
| 3,480,305 | 11/1969 | Jureit . |
| 3,498,170 | 3/1970 | Sanford . |
| 3,498,171 | 3/1970 | Jureit . |
| 3,603,197 | 9/1971 | Wood . |
| 3,633,454 | 1/1972 | Schmitt et al. . |
| 3,667,337 | 6/1972 | Burke . |
| 3,685,336 | 8/1972 | Black, Jr. . |
| 3,731,583 | 5/1973 | Jureit . |
| 3,841,194 | 10/1974 | Moehlenpah . |
| 3,841,195 | 10/1974 | Jureit . |
| 3,892,160 | 7/1975 | Jureit et al. . |
| 3,899,803 | 8/1975 | Burmlik . |
| 3,946,532 | 3/1976 | Gilb . |
| 3,951,033 | 4/1976 | Moehlenpah ............................. 411/468 |
| 4,165,672 | 8/1979 | Jureit et al. ............................... 72/326 |
| 4,235,148 | 11/1980 | Menge . |
| 4,274,241 | 6/1981 | Lindal . |
| 4,297,048 | 10/1981 | Jureit et al. . |
| 4,299,511 | 11/1981 | Demers . |

(List continued on next page.)

OTHER PUBLICATIONS

FA3–G1 Punch engineering schematic from Alpine Engineered Products, dated Jul. 5, 1996.

*Primary Examiner*—Ed Tolan
*Attorney, Agent, or Firm*—Crutsinger & Booth; John F. Booth

[57] ABSTRACT

A blade punch for forming teeth in a connector plate, the blade punch comprising an elongated blade having a metal working tip at one end and a shank at the other end. The blade has an elongated cross-section defined by opposing parallel spaced planar side walls and opposing ends. Each end comprises a major end wall and a minor end wall which converge to end wall intersections, where the end wall intersections are eccentric to a plane parallel to and midway between said side walls. Each end wall intersects a side wall at an obtuse angle. The metal working tip has opposed air cut faces abutting one another along an air cut edge and opposed first and second forming faces, each of the forming faces abutting one of the air cut faces along an exterior edge. Each of the air cut faces is bordered by a portion of one of the minor end walls, a portion of one of the side walls, the air cut edge, and one of the exterior edges. Each of the forming faces is bordered by a portion of one of the major end walls, a portion of one of the minor end walls, a portion of one of the side walls, and one of the exterior edges. A forming angle between 50° and 60° is formed between the first forming face and the exterior edge bordering the second forming face in a plane normal to the first forming face.

23 Claims, 5 Drawing Sheets

U.S. PATENT DOCUMENTS

| | | |
|---|---|---|
| 4,343,580 | 8/1982 | Moyer et al. . |
| 4,366,659 | 1/1983 | Jensen . |
| 4,410,294 | 10/1983 | Gilb et al. . |
| 4,418,509 | 12/1983 | Moyer et al. . |
| 4,423,615 | 1/1984 | Moyer et al. . |
| 4,486,115 | 12/1984 | Rionda et al. . |
| 4,586,550 | 5/1986 | Kitipornchai . |
| 4,630,424 | 12/1986 | Eberie et al. . |
| 4,639,176 | 1/1987 | Smith et al. . |
| 4,641,480 | 2/1987 | Mort . |
| 4,659,604 | 4/1987 | Lambuth . |
| 4,694,675 | 9/1987 | Mort . |
| 4,710,083 | 12/1987 | Wolf . |
| 4,734,003 | 3/1988 | Smith et al. . |
| 4,964,774 | 10/1990 | Lat et al. . |
| 5,071,280 | 12/1991 | Turner . |
| 5,116,179 | 5/1992 | Matlock . |
| 5,234,279 | 8/1993 | Poutanen . |
| 5,440,977 | 8/1995 | Poutanen . |
| 5,553,961 | 9/1996 | Olde . |
| 5,661,993 | 9/1997 | Black, Jr. . |
| 5,857,253 | 1/1999 | DeLong ............ 72/325 |

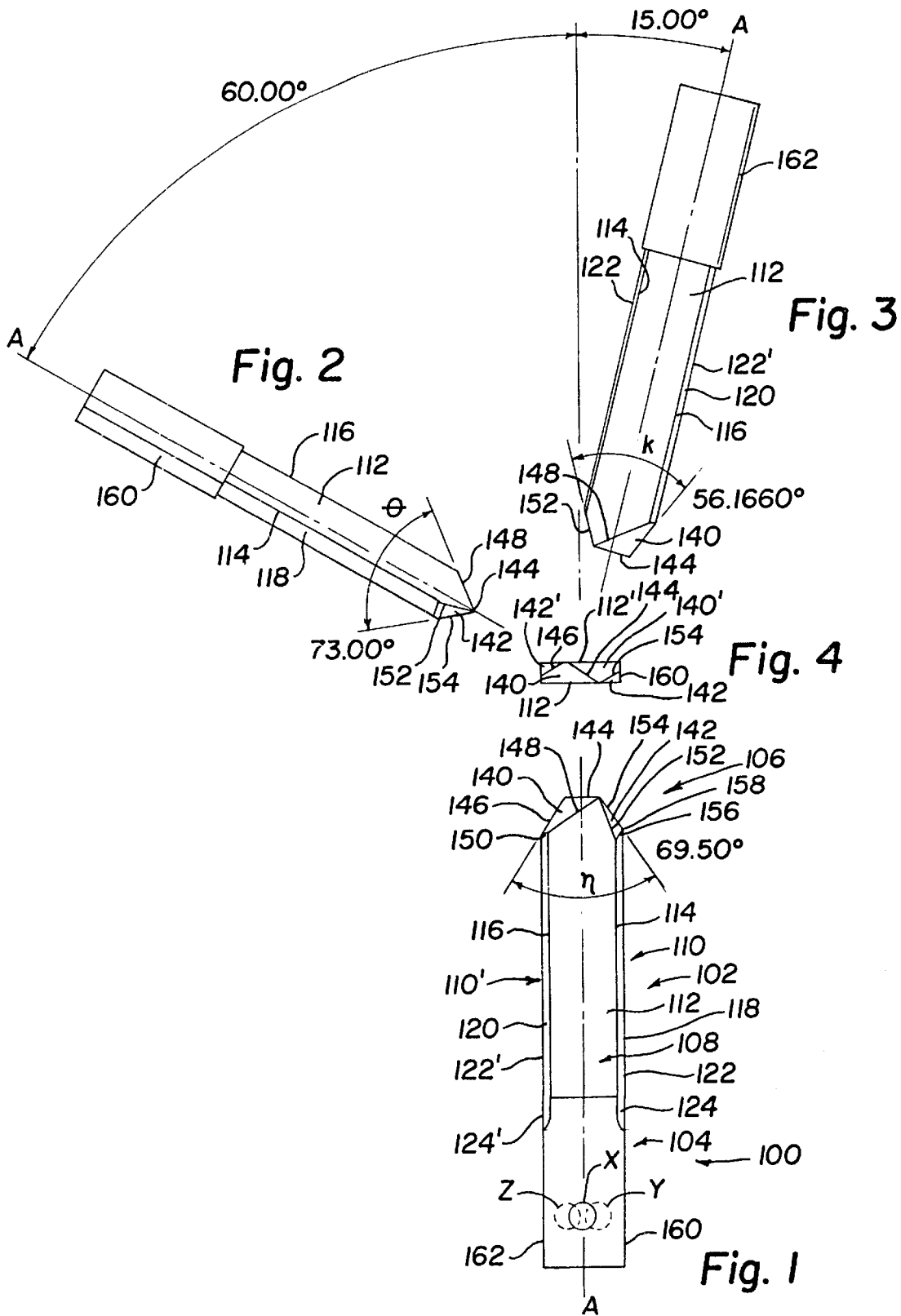

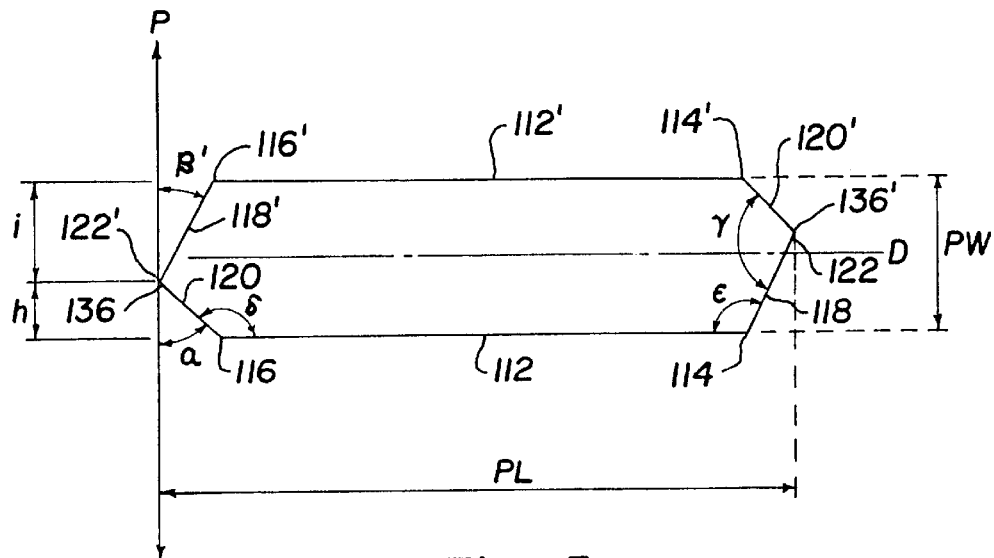
Fig. 5
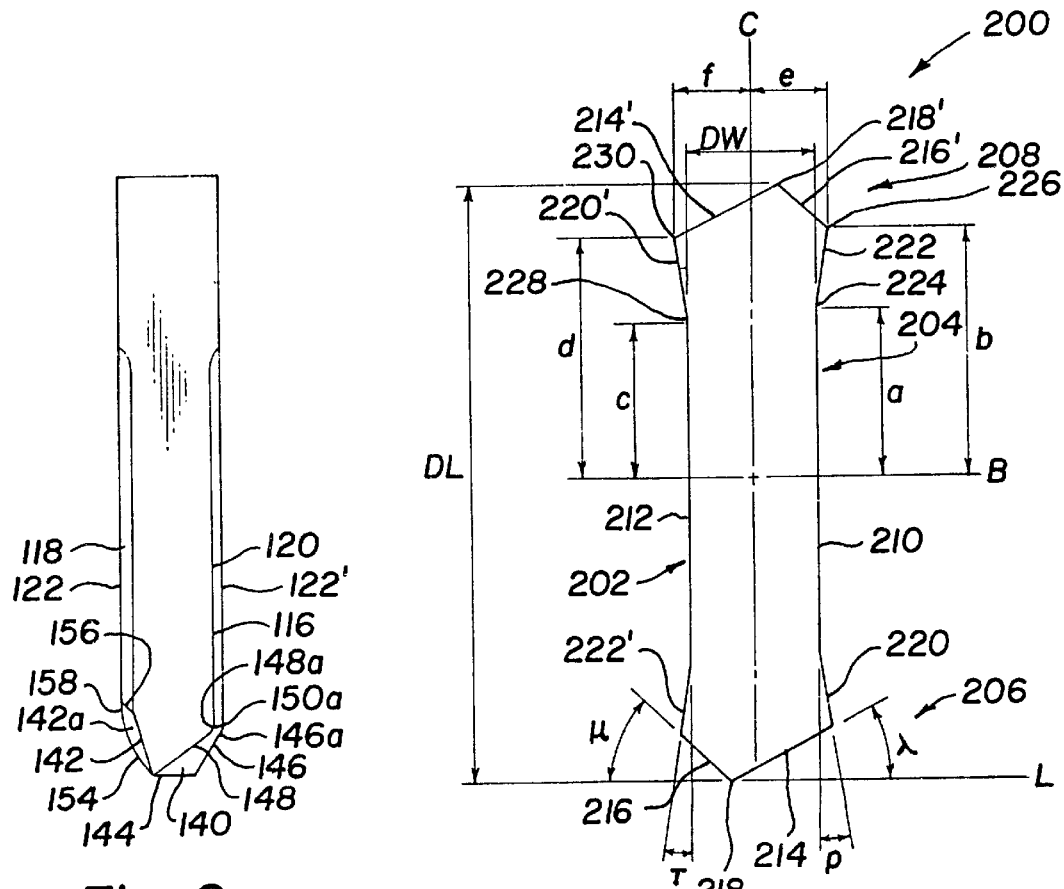
Fig. 6
Fig. 7

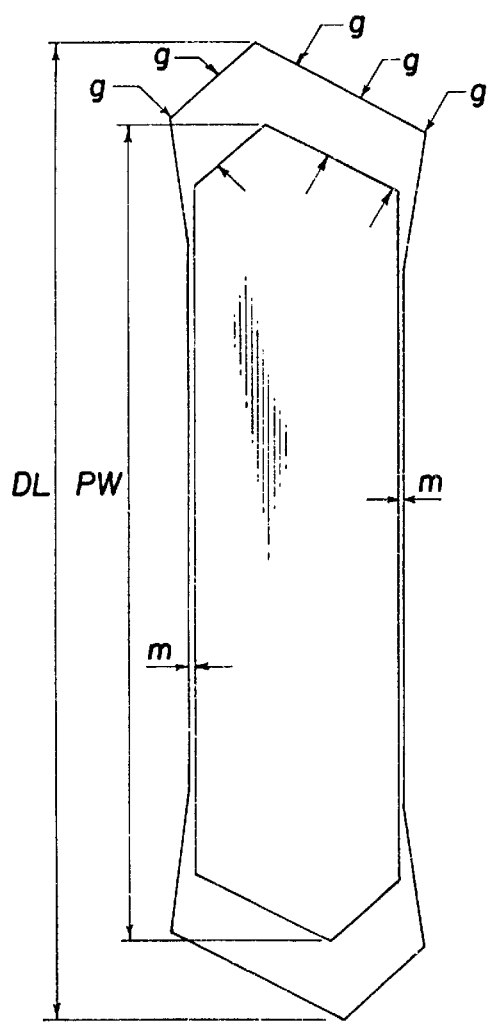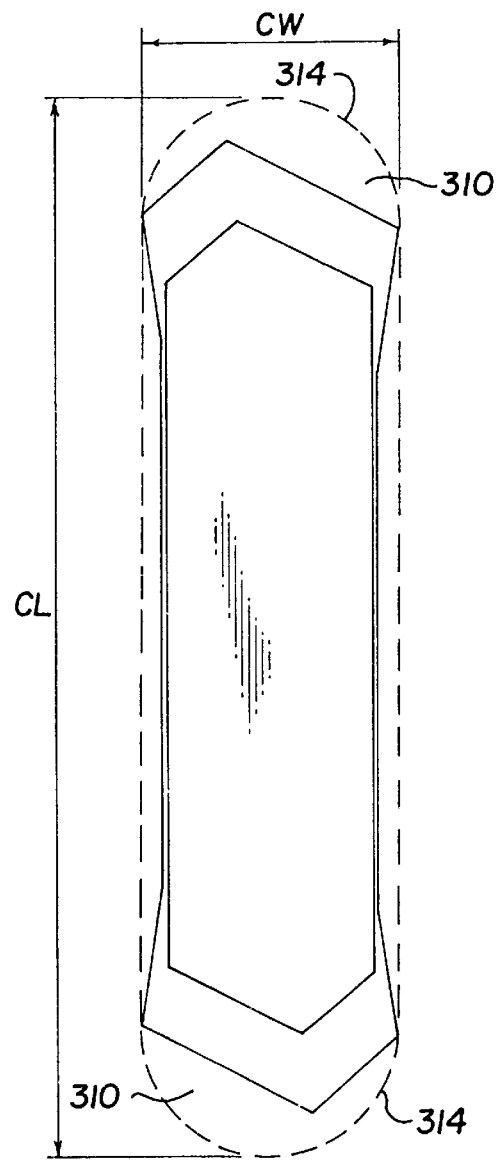
Fig. 10
Fig. 11

PUNCH AND DIE FOR PRODUCING CONNECTOR PLATES

CROSS-REFERENCE TO RELATED APPLICATION

This application is a Continuation-in-Part of application Ser. No. 08/710,369, filed Sep. 16,1996, now U.S. Pat. No. 5,833,421, entitled CONNECTOR PLATE.

TECHNICAL FIELD

This invention relates to a lance punch tool and a cooperating die or receiver used for producing teeth in truss connector plates.

BACKGROUND OF INVENTION

Connector plates are typically used to connect wood members to form trusses and joists. Connector plates are produced by feeding a steel plate into a stamping press. In the press, the steel plate is punched between a plurality of blade punches and a corresponding number of die cavities in a receiver or die block. In use, a connector plate has a planar steel backing with a plurality of teeth extending generally perpendicular to the backing.

Manufacturers of connector plates are constantly seeking ways to increase the strength characteristics of the connector plate teeth and to improve the methods of manufacture. The shape and strength characteristics of the teeth depend largely on the configuration of the blade punch and the die used to produce the teeth.

Problems are often encountered in the production of connector plate teeth. One such problem occurs as a formed connector plate is stripped from the die block. Often the connector plate teeth will bind in the die cavity. Another such problem is the fracturing of connector plate teeth at their roots as they are bent over the ends of the die cavity. Further, some currently used punch and die sets produce unwanted "viper teeth," or teeth with tears or rips along the side edges. This is especially a problem when higher grade steels are used to produce the connector plates. Unwanted fractures and tears reduce the strength of connector plate teeth and detrimentally affect the performance of the plate.

It is an object of the present invention to provide a punch and die set that consistently produce connector plate teeth of desired shape and strength and avoid the manufacturing problems encountered in many punch and die operations.

SUMMARY OF INVENTION

One embodiment of the invention provides a blade punch for forming teeth in a connector plate, the blade punch having an elongated blade having a metal working tip at one end and a shank at the other end. The blade has an elongate cross-section defined by opposing parallel spaced planar side walls and opposing ends. Each end comprises a major end wall and a minor end wall which converge to end wall intersections, where the end wall intersections are eccentric to a plane parallel to and midway between said side walls. Each end wall intersects a side wall at an obtuse angle. The metal working tip has opposed air cut faces abutting one another along an air cut edge and opposed first and second forming faces, each of the forming faces abutting one of the air cut faces along an exterior edge. Each of the air cut faces is bordered by a portion of one of the minor end walls, a portion of one of the side walls, the air cut edge, and one of the exterior edges. Each of the forming faces is bordered by a portion of one of the major end walls, a portion of one of the minor end walls, a portion of one of the side walls, and one of the exterior edges. A forming angle between 50° and 60° is formed between the first forming face and the exterior edge bordering the second forming face in a plane normal to the first forming face.

In another embodiment of the invention the blade punch is used in combination with a corresponding mating die. The mating die comprises a cavity having an elongate cross-section defined by opposing die sides and opposing die ends. The die ends comprise converging major and minor die end walls forming die end wall intersections. The die sides comprise parallel spaced planar die side walls, major flared walls extending from one end of the die side walls to the major die end walls and minor flared walls extending from the other end of the die side walls to the minor die end walls.

DESCRIPTION OF THE DRAWINGS

Drawings of a preferred embodiment of the invention are annexed hereto, so that the invention may be better and more fully understood, in which:

FIG. 1 is a side view of a blade punch;

FIG. 2 is a plan view of the blade punch showing the air cut angle;

FIG. 3 is a plan view of the blade punch showing a forming angle;

FIG. 4 is a view from the tip of the blade punch;

FIG. 5 is a section view from the tip of the blade punch;

FIG. 6 is a side view of an embodiment of a blade punch;

FIG. 7 is a top view of a die cavity that corresponds with the blade punch of FIG. 1;

FIG. 10 is a section view from the tip of a blade punch inserted within a corresponding die cavity;

FIG. 11 is a section view from the tip of a blade punch, corresponding die cavity and clearance area;

Figure 8:
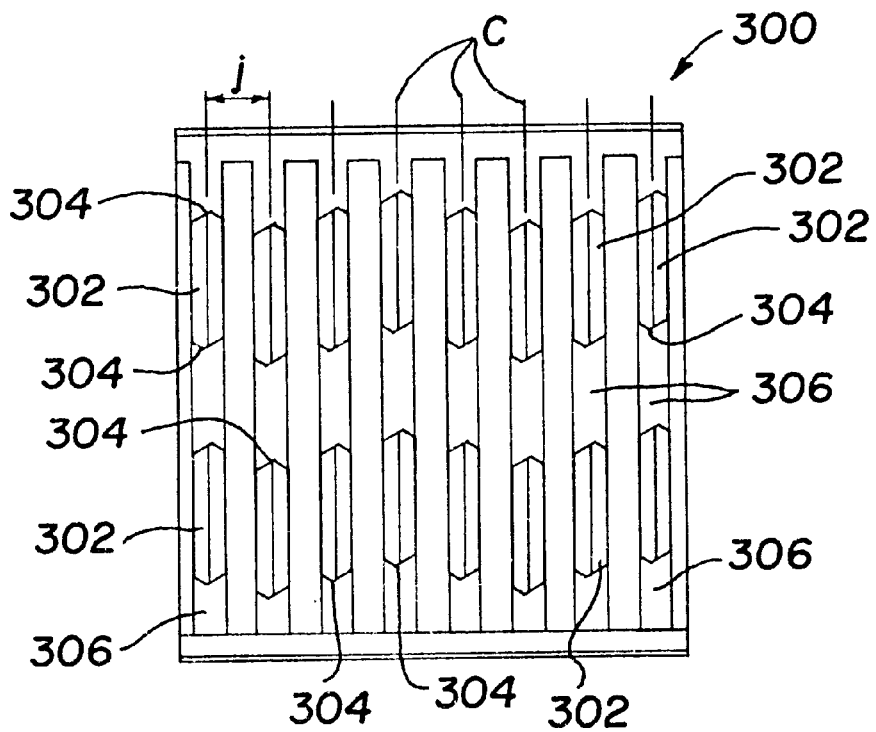
FIG. 8 is a top view of a die block.

Numeral references are employed to designate like parts throughout the various figures of the drawing. Terms such as "left," "right," "clockwise," "counter-clockwise," "horizontal," "vertical," "up" and "down" when used in reference to the drawings, generally refer to orientation of the parts in the illustrated embodiment and not necessarily during use. The terms used herein are meant only to refer to relative positions and/or orientations, for convenience, and are not to be understood to be in any manner otherwise limiting. Further, dimensions specified herein are intended to provide examples and should not be considered limiting.

DESCRIPTION OF A PREFERRED EMBODIMENT

Figure 12:
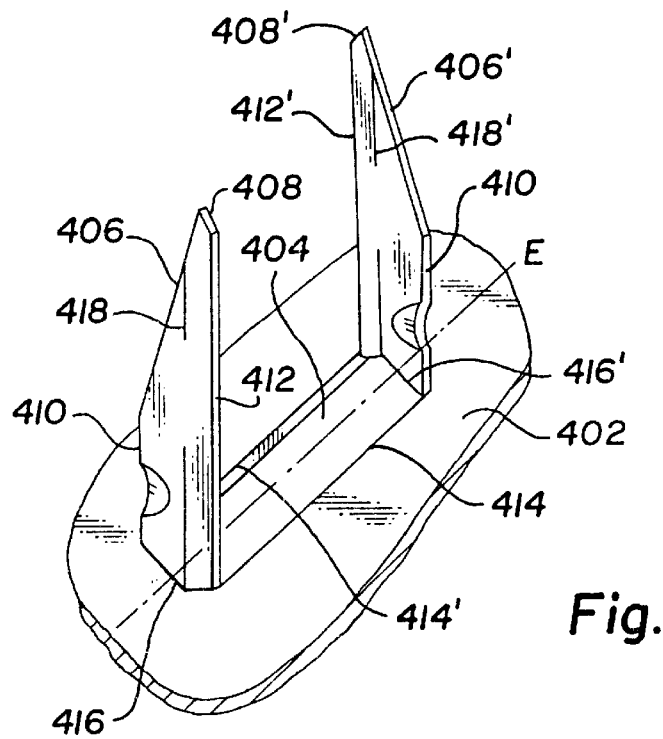
FIG. 12 is a perspective view of one pair of teeth formed on a connector plate.
Figure 13:
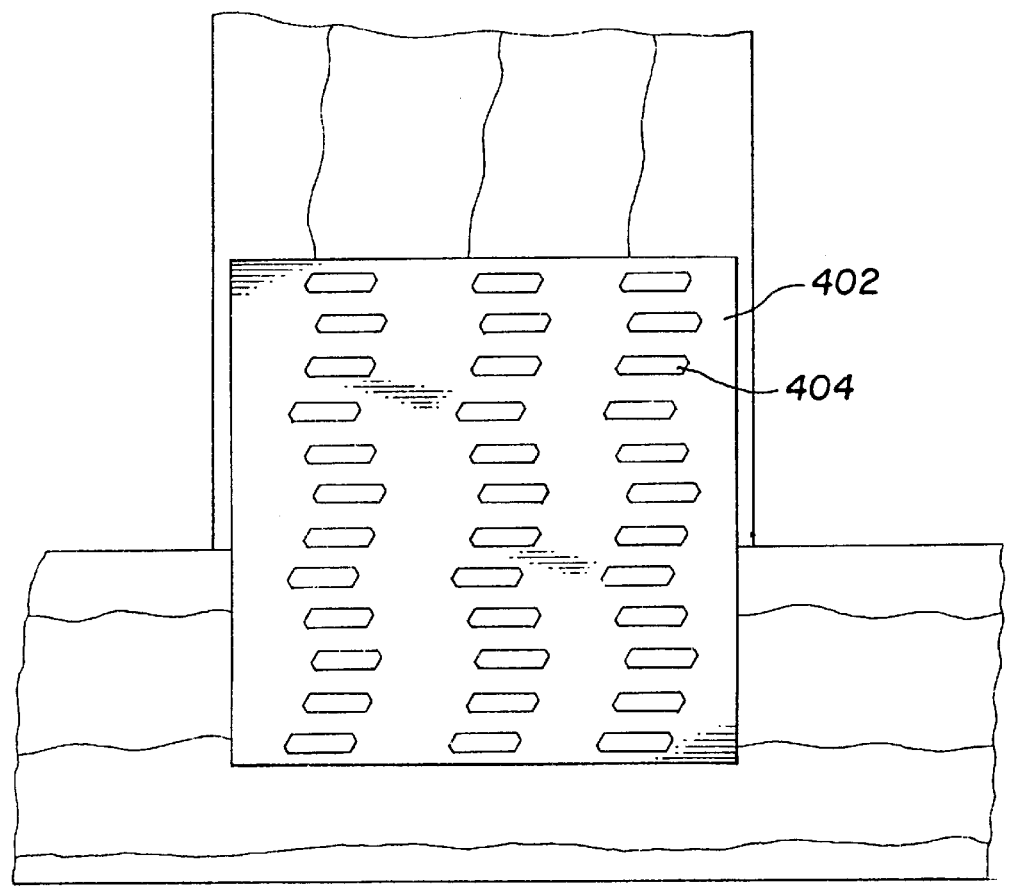
FIG. 13 is a plan view of a connector plate having a sinusoidal-wave tooth design in deployment connecting two wooden members.

Connector plates are produced by feeding a steel plate into a stamping press. In the press, the steel plate is stamped between a plurality of punches, such as the one seen in FIG. 1, and a corresponding receiver or die block, as seen in FIG. 8. The formed connector plate, such as the one seen connecting two truss members in FIG. 13, is comprised of a planar steel backing having a plurality of elongated slots. Each slot has a tooth at each end extending generally perpendicular to the backing, as seen in FIG. 12.

A blade or lance punch 100, as seen in FIG. 1, consists of an elongated blade 102 extending from a shank 104 to a metal working tip 106. FIG. 1 shows the front view of punch 100; it is understood that the hidden back view of the punch has corresponding symmetry. The elongated blade 102 is defined by opposing punch sides 108 and 108' and opposing punch ends 110 and 110'. The opposing punch sides 108 and 108' comprise parallel spaced planar punch side walls 112 and 112' each having two parallel longitudinal edges 114 and 116, and 114' and 116', respectively. The opposing punch ends 110 and 110' each comprise converging major punch end walls 118 and 118' and minor punch end walls 120 and 120' which intersect at end wall edges 122 and 122'. Each of the punch end walls 118, 118', 120 and 120' intersects a corresponding longitudinal edge 114, 114', 116 and 116', respectively. The punch end walls 118, 118', 120 and 120' extend longitudinally along the punch blade 102 from the shank 104 to the metal working tip 106. The punch end walls 118, 118', 120 and 120' form arcuate shoulders 124 and 124' where they merge into the shank 104.

As can be seen in the cross-section of the blade 102 illustrated in FIG. 5, the punch end walls 118' and 120 form heel angles α and β, respectively, defined by the angle of intersection between the punch end wall and a line P which is perpendicular to the side walls 112 and 112' of the punch. In the preferred embodiment, the minor punch end wall 120 has a heel angle α of 43.6° and the major punch end wall 118' has a heel angle β of 27.7°. The included angle γ between the major 118 and minor 120' punch side walls is 108.7°. The angle δ between the minor punch end wall 120 and the adjoining punch side wall 112 is 133.6°, and the angle ε between the major punch end wall 118 and the adjoining punch side wall 112 is 117.7°, in the preferred embodiment. It is understood that punch end walls 118 and 120' have corresponding angles identical to those of punch end walls 118' and 120, respectively. It is also understood that these angles may vary somewhat.

The intersections 136 and 136' of the minor and major end walls are eccentric to, or off-center from, the lateral axis D of the punch which is parallel to and midway between the side walls 112 and 112'. In the preferred embodiment, measured along line P, the distance h between the side wall 112 and the intersection 136 is 0.04 inches, and the distance i between the side wall 112' and the intersection 136 is 0.08 inches. Preferably, the punch width PW is 0.12 inches and the punch length PL is 0.50 inches. It is understood that these dimensions may be altered to provide for varying applications.

The metal working tip 106 of the punch, seen in FIG. 1, comprises two air cut faces 140 and 140' and two forming faces 142 and 142'. The air cut faces 140 and 140' abut one another along the air cut edge 144. The air cut face 140 is bordered by the air cut edge 144, an exterior edge 146, an interior edge 148, and an edge 150 between the air cut face 140 and the minor end wall 120. The forming face 142 is bordered by an interior edge 152, an exterior edge 154, an edge 156 between the forming face 142 and the major punch end wall 118, and an edge 158 between the forming face 142 and the minor punch end wall 120'. It is undersood that air cut face 140' and forming face 142' have corresponding edges, not shown. In the preferred embodiment, the included angle η between the exterior edges 154 and 156 is 69.500°. It is understood that angle η may be somewhat altered.

In FIG. 2 the punch 100 has been rotated along its longitudinal axis A by 60.000°, such that the air cut face 140 is perpendicular to the plane of the page. This view illustrates the air cut angle θ, that is the angle between the air cut faces 140 and 140', which in the preferred embodiment is 73.000°. This angle has been carefully designed to produce a connector plate with teeth of optimum strength, but it is understood that the angles may be somewhat altered.

In FIG. 3 the punch 100 has been rotated 15.000° along its longitudinal axis A, such that the forming face 142 is perpendicular to the plane of the page. This view illustrates the forming angle κ, that is the angle between the forming face 142 and the exterior edge 146, which in the preferred embodiment is 56.166°. This angle has been carefully designed to prevent twisting and deformation of the steel plate during production of the connector plate., but it is understood that the angles may be somewhat altered The precise combination of angles in the preferred embodiment allow connector plates of high grade steel to be manufactured without detrimental deformation and tearing of the material.

FIG. 4 shows the punch 100 from a view from the tip. The air cut edge 144, exterior edges 146 and 154, and punch end wall edges 118, 188', 120 and 120' are clearly visible. Also visible are air cut faces 140 and 140' and forming faces 142 and 142'.

In a preferred embodiment of the invention, several of the edges of the punch 100 are ground and polished, or rounded, to eliminate sharp edges, as seen in FIG. 6. Specifically, edge 150 is rounded into an arcuate surface 150a joining the air cut face 140 and the minor punch end wall 120. The juncture 148a of interior edge 148 and longitudinal edge 116 is ground and polished to eliminate a sharp comer. Exterior edge 146 and end wall edge 122' are similarly rounded at their juncture 146a. Further, the juncture of forming face 142 and punch end wall 118 is ground and polished such that exterior edge 154, edge 158, edge 156 and end wall edge 122 are rounded. The rounding of these edges prevents unwanted shearing and tearing of the connector plate during production. Air cut edge 144 remains sharp and exterior edges 146 and 154 remain sharp in proximity to air cut edge 144.

Referring again to FIG. 1, the shank 104 of the punch 100 comprises mounting hole X, which is centered between the opposing ends 160 and 162 of the shank 104, and extends through the punch 100. The mounting hole may be offset from the center of the punch as in positions Y and Z. During fabrication of a connector plate, multiple punches are mounted in a punch retainer. A shaft is run through a hole in the punch retainer and through the mounting holes of the punches. By arranging a plurality of punches with varying punch hole positions, a single straight shaft can be used to mount the punches in the wave pattern apparent on the connector plate in FIG. 11. The wave pattern consists of spaced rows of sinusoidal slots with each cycle of slots including at least a maximum, a minimum, and two zero-point positions.

A single die cavity 200 is illustrated in FIG. 7. The die cavity 200 has an elongated cross-section defined by opposing die sides 202 and 204 and opposing die ends 206 and 208. The die sides 202 and 204 comprise parallel spaced planar die side walls 210 and 212, respectively. Die side 204 further comprises major flared wall 220 and minor flared wall 222. Similarly, die side 202 further comprises major flared wall 220' and minor flared wall 222'. The die ends 206 and 208 comprise a major die end wall 214 and 214', respectively, and minor die end wall 216 and 216', respectively, which converge at a die end wall intersections 218 and 218', respectively.

The die end walls 214 and 216 form heel angles λ and μ, respectively, as defined by the angle of intersection between the die end walls and a line L which is perpendicular to the die side walls 210 and 212. The die end wall heel angles are identical to the heel angles of the punch. Specifically, the major die end wall 214 has an heel angle λ of 27.7°, and the minor die end wall 216 has an heel angle μ of 43.6°. It is understood that die end walls 214' and 216' have corresponding heel angles, identical to those of die end walls 214 and 216, respectively. It is understood that the heel angles may vary somewhat.

The die sides 202 and 204 have flared walls at either end. The connector plate teeth are formed over the end walls of the die cavity, and the added space provided by the flared walls 220, 220', 222 and 222' prevents binding of the connector plate teeth when they are stripped from the die block 300 (seen in FIGS. 8 and 9). Die side walls 210 and 212 have major flared walls 220 and 220' and a minor flared walls 222 and 222', respectively.

The distance α from the lateral centerline B of the die cavity to the interior end 224 of the minor flared wall 222 is 0.1648 inches, and the distance b from centerline B to the exterior end 226 of the minor flared wall 222 is 0.2533 inches. The distance c from centerline B to the interior end 228 of the major flared wall 220' is 0.1519 inches, and the distance d from centerline B to the exterior end 230 of the major flared wall 220' is 0.2456 inches. The distance between the longitudinal centerline C of the die cavity 200 and side walls 210 and 212 is 0.0625 inches making the die cavity width DW 0.125 inches. The distances e and f from the longitudinal centerline C to the exterior ends 226 and 230 of the flared walls 222 and 220', respectively, is 0.0745 inches. The overall die cavity length DL is 0.5975 inches. The major flared angle ρ of major flared wall 220 is 7.2981° and the minor flared angle τ of minor flared wall 222' is 7.71560°. It is understood that flared walls 220' and 222 have flared angles identical to those of flared walls 220 and 222', respectively. It is understood that the dimensions of the die cavity may be altered to provide for varying applications.

Figure 9:
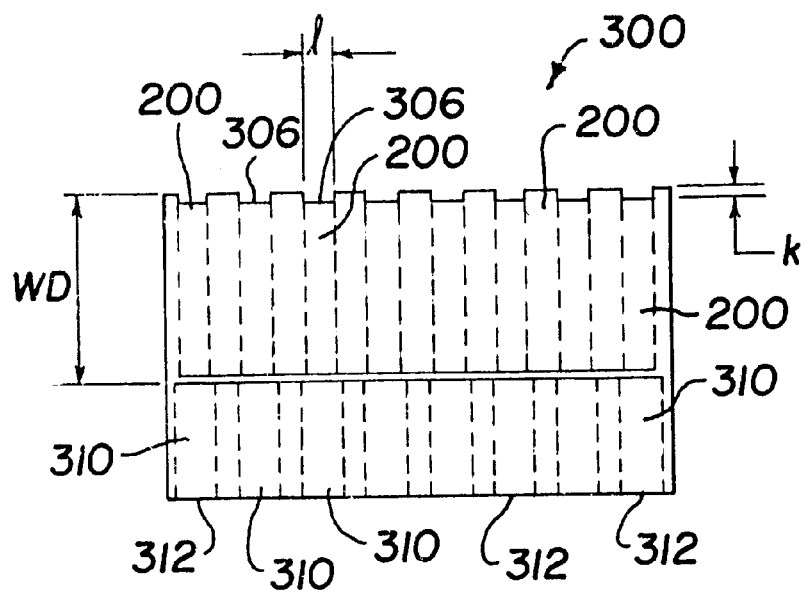
FIG. 9 is a side view of a die block.

A receiver or die block such as that illustrated in FIGS. 8 and 9, is formed with a plurality of die cavities which mate with a plurality of corresponding punches. In FIG. 8 die block 300 is seen from a top view. A plurality of die cavities 302 arranged in a sinusoidal wave pattern are formed in the die block 300. The distanced between the longitudinal axes C of adjacent die cavities is precisely 0.250 inches in the preferred embodiment. Extending from the die ends 304 are longitudinal grooves 306 centered on the longitudinal axes C of the corresponding die cavity 302. As best seen in FIG. 9, each groove 306 has a width l of approximately 0.124 inches. Each groove 306 has a depth κ of approximately 0.040 inches. The grooves 306 are designed to prevent fracturing of the connector plate teeth at the tooth root as they are bent over the die cavity end walls 304. The dimensions of the die block may be altered to provide for varying applications and punch arrangements.

In FIG. 10 a die cavity cross-section is shown overlaid with a punch cross-section in order to illustrate the clearances between the punch and die cavity. As described herein, the heel angles of the end walls of both the punch and die are identical. The clearance distance g between the punch and die end walls, as measured along a line perpendicular to the end walls, therefore, remains constant and in the preferred embodiment is 0.040 inches. This clearance distance g is specifically designed for stamping 20 gauge galvanized steel. It is understood that the distance g would change if different gauge steel were employed. The width of the die cavity DW is 0.125 inches (as seen in FIG. 7), and the width of the punch PW is 0.120 inches (as seen in FIG. 5). The clearance distances m between the side walls of the punch and die is, therefore, 0.0025 inches (as seen in FIG. 5). With a designed clearance of only 0.0025 inches, the steel plate of a connector plate is sheared between the side walls of the die cavity and the side walls of the punch with minimal twisting and deformation of the steel. The shearing action resulting from the small clearance allows the connector plate teeth to be wiped or "ironed" by the punch end walls for uniform shape along the entire length of the bend spine of the teeth (as seen in FIG. 12). The larger clearances often found in other die and punch sets allow a connector plate to free-form substantially prior to shearing.

The cross-section of the die cavity remains constant for a working depth WD into the die block, as seen in FIG. 9. The working depth WD is at least equal to the height of a formed connector plate tooth and may be deeper to allow sharpening of the die to extend its useful life. The die cavity 200 preferably widens to a clearance area 310 below this working depth WD. The clearance area 310 of the die cavity 200 allows for metal chips and other debris created during the manufacture of connector plates to fall through openings 312 at the lower end of the die block 300. The clearance area cross-section, best seen in FIG. 11, is preferably 0.649 inches in length CL, 0.150 inches in width CW, and has semicircular ends 314. It is understood, however, that this clearance area is in no way related to the formation of the tooth and may vary in shape and dimension.

In FIG. 12 a pair of opposed connector teeth 400 and 400' extend generally perpendicularly to the connector plate backing 402 at either end of an elongated slot 404. The slot 404 and teeth 400 and 400' are formed from a steel plate in a press by a mating punch and die block set as described herein. The air cut edge 144 of the punch 100 contacts the steel plate first as the punch is moved toward the die block 300, and eventually creates the long top edges 406 and 406' of the teeth. The short top edges 408 and 408' are formed as the steel plate slightly twists under the influence of the punch 100 as it extends through the plate. The side edges 410, 410', 412 and 412' of the teeth and the side edges 414 and 414' of the slot 404 are formed as the steel plate is sheared between the punch side walls 112 and 112' and die cavity side walls 210 and 212, respectively. Each tooth root 416 and 416' is formed as the steel is bent over the end walls 214, 214', 216 and 216' of the cavity 200. The grooves 306 in the die block 300 prevent fracturing along the tooth root 416 and 416'. As the steel plate is wiped against the end 206 and 208 of the die cavity by the ends 110 and 110' of the punch, the bend spines 418 and 418' are formed. The bend spines 418 and 418' are offset from the longitudinal axis E of the slot 404. The eccentricity of the bend spines 418 and 418' is caused by the eccentricity of the intersections 136 and 136' of the end walls of the punch. The grooves 306 in the die block 300 (seen in FIG. 8) prevent unwanted tearing of the teeth 400 and 400' as they are bent over the die cavity ends 304. The flared walls 220, 220', 222 and 222' of the die cavities (seen in FIG. 7) prevent binding of the teeth 400 and 400' in the die cavity when the connector plate is stripped from the die block 300. The clearance areas (seen in FIG. 10) allows for debris created during manufacture to exit the die block 300. The configuration of the teeth 400 and 400' and the staggered wave pattern of the slots 404, evident in FIG. 13, give the connector plate optimum strength.

The foregoing discloses various structures of an improved punch and die set for producing connector plates. Modifications may suggest themselves to those skilled in the art without departing from the spirit and scope of the invention. Also, those skilled in the art may prefer to use some, but not all, of the features and advantages of the invention. The invention is not to be restricted to the specific forms shown, or the uses mentioned, except as to the extent required by the claims.

Having described the invention, I claim:

1. A blade punch for forming teeth in a connector plate, said blade punch comprising:

an elongate blade having a metal working tip at one end and a shank at the other end, said blade having an elongate cross-section defined by opposing sides and opposing ends, said sides comprising parallel spaced planar side walls, said ends each comprising a major end wall and a minor end wall converging to an end wall intersection, each said end wall intersecting a side wall at an obtuse angle, said end wall intersections being eccentric to a plane parallel to and midway between said side walls, said metal working tip having opposed air cut faces abutting one another along an air cut edge, said metal working tip having opposed first and second forming faces, each of said forming faces abutting one of said air cut faces along an exterior edge, each said air cut face bordered by edges between said air cut face and a portion of one of said minor end walls, a portion of one of said side walls, said air cut edge, and one of said exterior edges, each of said forming faces bordered by edges between said forming face and a portion of one of said major end walls, a portion of one of said minor end walls, a portion of one of said side walls, and by one of said exterior edges, wherein a first forming angle is formed between said first forming face and said exterior edge bordering said second forming face in a plane normal to said first forming face, wherein said forming angle is between about 40° and 60°.

2. A blade punch as in claim 1 wherein:

a second forming angle is formed between said second forming face and the exterior edge bordering said first forming face in a plane normal to said second forming face, wherein said second forming angle is identical to said first forming angle.

3. A blade punch as in claim 1 wherein:

said forming angle is 56.166°.

4. A blade punch as in claim 1 wherein:

the angle formed between said air cut faces is 73°.

5. A blade punch as in claim 1 wherein:

the angle formed between said exterior edges in a plane parallel to said side walls is 69.5°.

6. A blade punch as in claim 1 wherein:

said side walls are parallel to a reference plane;

wherein a plane parallel to one of said forming faces is perpendicular to said reference plane when said blade punch is rotated 15° about a longitudinal axis.

7. A blade punch as in claim 1 wherein:

said side walls are parallel to a reference plane;

wherein a plane parallel to one of said air cut faces is perpendicular to said reference plane when said blade punch is rotated 60° about a longitudinal axis.

8. A blade punch as in claim 1 wherein:

said shank comprises a mounting hole.

9. A blade punch as in claim 8 wherein:

said mounting hole is centered on a longitudinal axis of said blade punch.

10. A blade punch as in claim 1 wherein:

said end walls intersect at an angle of 108.7°.

11. A blade punch as in claim 1 wherein:

each of said minor end walls intersect a side wall at an angle of 133.6°.

12. A blade punch as in claim 1 wherein:

each of said major end walls intersect a side wall at an angle of 117.7°.

13. A blade punch as in claim 1 wherein:

said edges between said forming faces and said portion of said major end walls, said portion of said minor end walls and said portion of said side walls are rounded.

14. A blade punch as in claim 1 wherein:

said exterior edges are at least partially rounded.

15. A blade punch as in claim 1 wherein:

said edge between each of said air cut faces and a portion of one of said minor end walls is rounded to form an arcuate surface.

16. The combination of the punch of claim 1 with a corresponding mating die, wherein said die comprises a cavity, said cavity having an elongate cross-section defined by opposing die sides and opposing die ends, each of said die ends comprising major and minor die end walls converging to a die end wall intersection, said die sides comprising parallel spaced planar die side walls, each of said die sides further comprising a major flared wall extending from one end of said die side wall to said major die end wall and a minor flared wall extending from the other end of said die side wall to said minor die end wall.

17. The combination as in claim 16 wherein:

each of said die end wall intersections is eccentric to a plane parallel to and midway between said die side walls.

18. The combination of claim 16 wherein said die end wall intersections are on opposite sides of a plane parallel to and midway between said die side walls.

19. The combination as defined in claim 16 wherein said major and minor die end walls intersect one another at an angle of 108.7°.

20. The combination as defined in claim 16 wherein said minor converging die end wall intersects a plane parallel to said die side walls at an angle of 133.6°.

21. The combination as defined in claim 16 wherein the major converging die end wall intersects a plane parallel to said die side wall at an angle of 117.7°.

22. The combination as defined in claim 16 wherein:

said major flared walls intersect a plane parallel to said die side walls at an angle of 7.2981°.

23. The combination as defined in claim 16 wherein:

said minor flared walls intersect a plane parallel to said die side walls at an angle of 7.7156°.

* * * * *

UNITED STATES PATENT AND TRADEMARK OFFICE
CERTIFICATE OF CORRECTION

PATENT NO.    : 6,066,048

DATED         : May 23, 2000

INVENTOR(S)   : William F. Lees

It is certified that error appears in the above-identified patent and that said Letters Patent is hereby corrected as shown below:

Column 5, line 43, delete "distanced" and insert --distance $j$--.

Signed and Sealed this

Tenth Day of April, 2001

Attest:

NICHOLAS P. GODICI

Attesting Officer    Acting Director of the United States Patent and Trademark Office